March 6, 1951 G. H. BUTTERFIELD 2,544,246
CORNEAL CONTACT LENS
Filed Aug. 1, 1950

GEORGE H. BUTTERFIELD
INVENTOR.

BY
James D. Givnan
ATT'Y

Patented Mar. 6, 1951

2,544,246

UNITED STATES PATENT OFFICE 2,544,246

CORNEAL CONTACT LENS

George H. Butterfield, Portland, Oreg.

Application August 1, 1950, Serial No. 177,050

3 Claims. (Cl. 88—54.5)

This invention is a continuation in part of my application S. N. 107,948 filed August 1, 1949 and relates to contact lenses and more particularly to a contact lens that covers the corneal region of the eye.

The conventional contact lens, that is, the contact lens which has a scleral flange molded to fit the eyeball has many limitations. Not the least among these is the fact that the wearing time is quite short; a few hours' wear causes a corneal misting or halation brought about presumably by the pressure of the lens cutting off blood circulation in the limbal region and the prevention of free flow of lacrimal fluid. Other factors preventing this lens from coming into wide use are the need for a special accessory fluid between the lens and the eye. In addition, the difficulties of fitting them to the individual eyeball are apparent and well-recognized. For that reason, a practical corneal lens has been much sought after. In theory, the corneal lens is the ideal method of correcting visual deficiencies, since it does not touch the limbal region, needs no accessory fluid, and has other beneficial optical properties known to workers in the art.

The applicant, in his invention, has provided a corneal lens which can be worn continuously throughout the full waking day by the average person without experiencing corneal blurring or discomfort of any kind.

Furthermore, the lens of the applicant overcomes a common deficiency of corneal lenses, that is, their tendency to fall away from the eyeball due to insufficient surface tension or capillary attraction or due to the eyelid lifting the lens away from the cornea.

In addition, the applicant has provided a contact lens which needs no accessory fluid, which does not give the eye a bulging appearance, which is perfect from the viewpoint of cosmetology and ophthalmology, which is self-cleaning, which is easy to fit, which is free of marginal aberrations, which can be used by persons with pathological conditions of the cornea, and which may be easily and inexpensively manufactured.

With the above objects in view, as well as others which will appear as the specification proceeds, the invention comprises the construction, arrangement, and combination of parts as now to be more fully described and as hereinafter to be specifically claimed, it being understood that the disclosure is merely illustrative and intended in no way in a limiting sense, changes in details of construction and arrangement of parts being permissible so long as within the spirit of the invention and the scope of the claims which follow.

Figure 1:
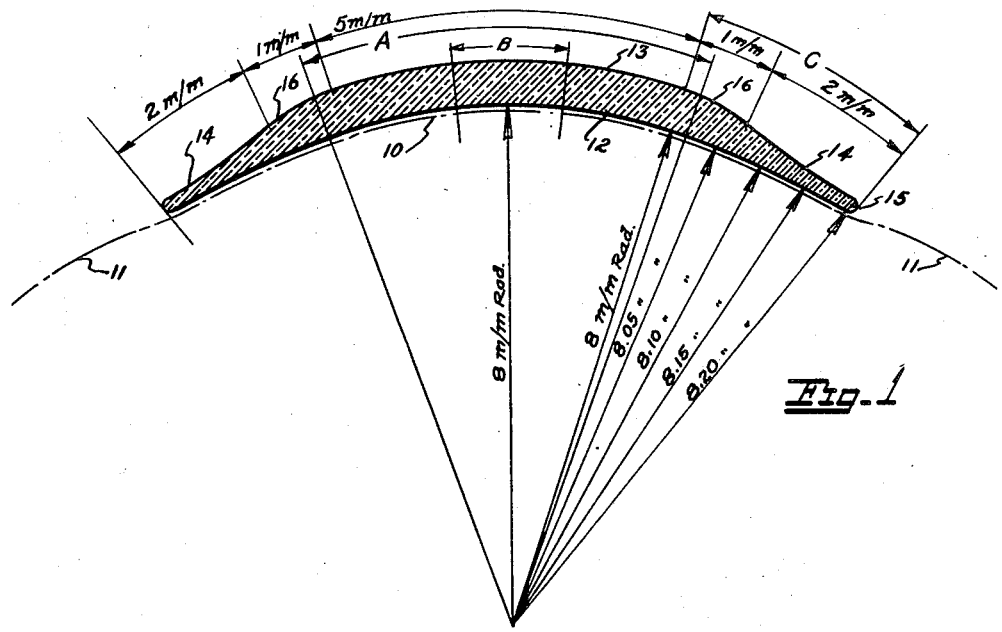
Figure 1 shows a greatly enlarged sectional view of the lens of the present invention taken through the center thereof.
Figure 2:
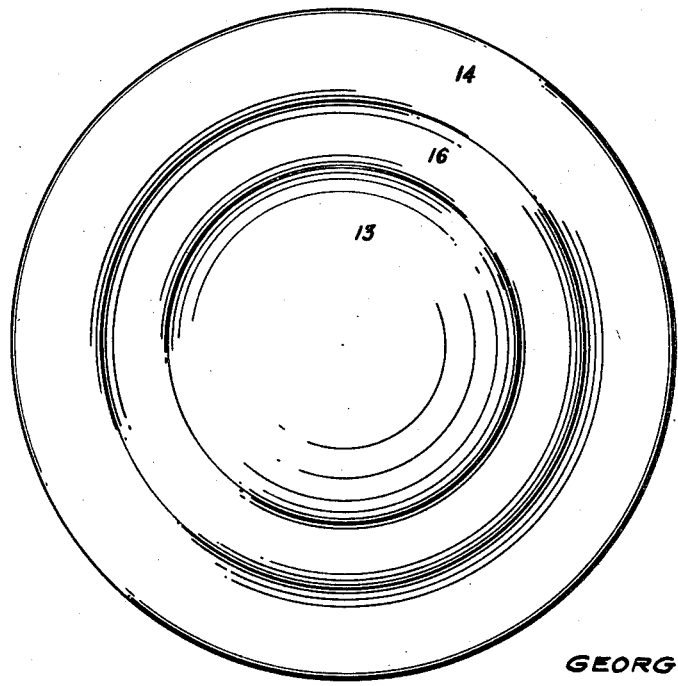
Figure 2 shows a greatly enlarged view of the anterior, convex face of the lens of the instant invention.

Referring to Figure 1, the lens which may be made of methyl methacrylate or similar substances is shown in conjunction with a human eyeball, shown in broken lines. The reference character 10 designates the surface of the cornea while the limbal region is designated 11. Generally speaking, the lens of the applicant is of concavo-convex type and consists of a posterior, concave side 12 and an anterior, convex side 13. The concave side 12 is of a perfectly spherical shape over the central area of the lens indicated by the dimension 5 mm. It is to be noted that the lens shown in the drawing is provided with dimensions; these dimensions are given to show the relative proportionalities between the parts of the lens. The particular lens shown is illustrative of a lens particularly made for a person having a cornea whose radius of curvature in the central portion is 8 mm. The diameter of the central area designated by the dimension 5 mm. is slightly smaller than the maximum diameter of the pupil, the latter diameter being indicated by the dimensional character A. The convex side 13 of the lens is formed in the central portion with the curvature needed to supply the needed visual correction to the eye; the area that is thus formed is also slightly less in diameter than the maximum diameter of the pupil. The area subtended by the pupil in its minimum contracted condition is indicated by the character B. The curvature of the concave side 12 of the lens changes as the point on the surface is further from the center of the lens; at the edge of the area indicated by the 5 mm. dimension the radius of curvature becomes progressively greater until it reaches a maximum at the outer edge 15 of the lens. In the preferred embodiment shown in the drawing, the radius of curvature increases by 2½% from the central spherical area to the edge 15. The outside diameter of the lens must, of course, be such that the lens may lie on the surface of the cornea 10 within the area defined by the limbus 11. Actually, the concave side 12 of the lens approximates the surface of a paraboloid for a reason to be discussed later.

The anterior or convex side 13 of the lens is formed with a rim portion 14 adjacent to the edge 15. This rim portion is relatively thin and its surface is generally parallel to the surface of the concave side throughout its extent. The rim portion 14 can be said to extend approximately 2 mm. inwardly of the edge 15 and it is indicated by the dimension 2 mm. Between the central vision-correcting portion of the convex side of the lens and the rim portion 15 is a transition area indicated by the dimension 1 mm. This transition area has a smoothly curved surface leading from the thick central part of the lens to the thin outer part and should be such as to present no abrupt changes in contour that may be engaged by the conjunctiva of the eyelid causing displacement of the lenses. The outer edge 15 of the lens is formed as a smoothly rounded surface.

The operation of the lens is based on the fact that the average human cornea is not exactly spherical, but actually is more like a paraboloid, with the central, visual portion being a sphere to all intents and purposes, but with the radius of curvature becoming greater as one leaves the visual area and progresses outwardly toward the limbus.

Yet, in the past, all corneal lenses have been made on the theory that the cornea was spherical throughout and the concave side of the lens has been made spherical also. It can be seen that, if a spherically surfaced lens is used on a paraboloidal cornea, the lens will necessarily contact the cornea at the conus and at the edge. Now, the sphere and the paraboloid are quite similar at the conus and no undue pressure takes place; at the edge, however, the pressure is great enough to cause discomfort and blurring. If the spherical surface of the lens in such a case is chosen large enough to prevent this localized pressure, the lens will be too loose and will easily separate from the cornea because of insufficient capillary attraction and because there will necessarily be a large space between the cornea and the edge of the lens and the eyelid will slip under the lens and lift it.

Now, the theory behind all corneal contact lenses is that the lens be so formed that it can ride on a film of lacrimal fluid which exists between cornea and contact lens; if the lens does not float on such a film or causes a local pressure, there will be discomfort, halation, and the like and if the space between lens and cornea is too great, the capillary attraction will not exist and the lens may fall away from the eye. The applicant, by providing a lens whose contact surface is very close to the shape of the eyeball, has brought about the ideal corneal contact lens condition.

Since none of the lens outside of the area of the maximum extension of the pupil, designated A in the drawing, is to be used for overcoming the sight deficiency and is only present to present the maximum contact area between lens and cornea for maximum capillary attraction, it is possible for the applicant to use the non-visual area in a way to best overcome the past deficiencies of corneal contact lenses. The particular shape provided allows the eyelid to slide smoothly over the edge of the lens. The result is that there is no pain or sensation in the eyelid, and there is no opportunity for the eyelid to pry the lens away from the cornea.

I claim:

1. A corneal contact lens of concavo-convex form in section and of a size to lie within the area defined by the limbus having an inner central spherical area conforming to the corresponding area of the cornea to which the lens is applied so that undue pressure will not be present at any point, the remainder of said inner surface extending radially outward toward the limbus being formed on a curve different from that of said central area and corresponding in curvature with that portion of the corneal peripheral area to which the lens is applied, whereby space is provided for the natural uninterrupted circulation of lacrimal fluids between said lens and the cornea.

2. A corneal contact lens as in claim 1 wherein the anterior marginal area is gradually reduced in thickness toward the periphery of the lens by an arcuate facing in reverse curvature to the convex surface of the lens, both the junction of said arcuate facing with the remaining central convex portion and the lens edge having a smooth transition whereby the eyelids may pass freely over said edge.

3. A corneal contact lens as in claim 1 wherein the anterior marginal area is gradually reduced in thickness toward the periphery of the lens by a concave facing in reverse curvature to the convex surface of the lens, both the junction of said concave facing with the remaining central convex portion and the lens edge having a smooth transition whereby the eyelids may pass freely over said edge.

GEORGE H. BUTTERFIELD.

REFERENCES CITED

The following references are of record in the file of this patent:

UNITED STATES PATENTS

| Number | Name | Date |
|---|---|---|
| 2,510,438 | Tuohy | June 6, 1950 |

FOREIGN PATENTS

| Number | Country | Date |
|---|---|---|
| 805,592 | France | Aug. 31, 1936 |

OTHER REFERENCES

"The New Hamblin-Dallos Contact Lens" (publication), page 143 of "The Optician," April 1, 1938.

"Contact Lens Note" (publication), page 68 of "The Optician," March 4, 1947.

"Changes in the Form of the Contact Lens Optic" by Jones, published in "The Optician," December 31, 1948, pages 617 and 618.

"The Question of Contact Lens Design," publication appearing in "The Optician," Feb. 4, 1949, pages 37 to 39.

"The Corneal Lens" by Dickenson, from the publication "The Optician," September 2, 1949, pages 141 to 144.

"Corneal Contact Lenses" by Bier, published in "The Optician," September 9, 1949, page 185.